(No Model.)
W. HARVEY.
FEED ROLL FOR GANG SAWS.
No. 358,550. Patented Mar. 1, 1887.
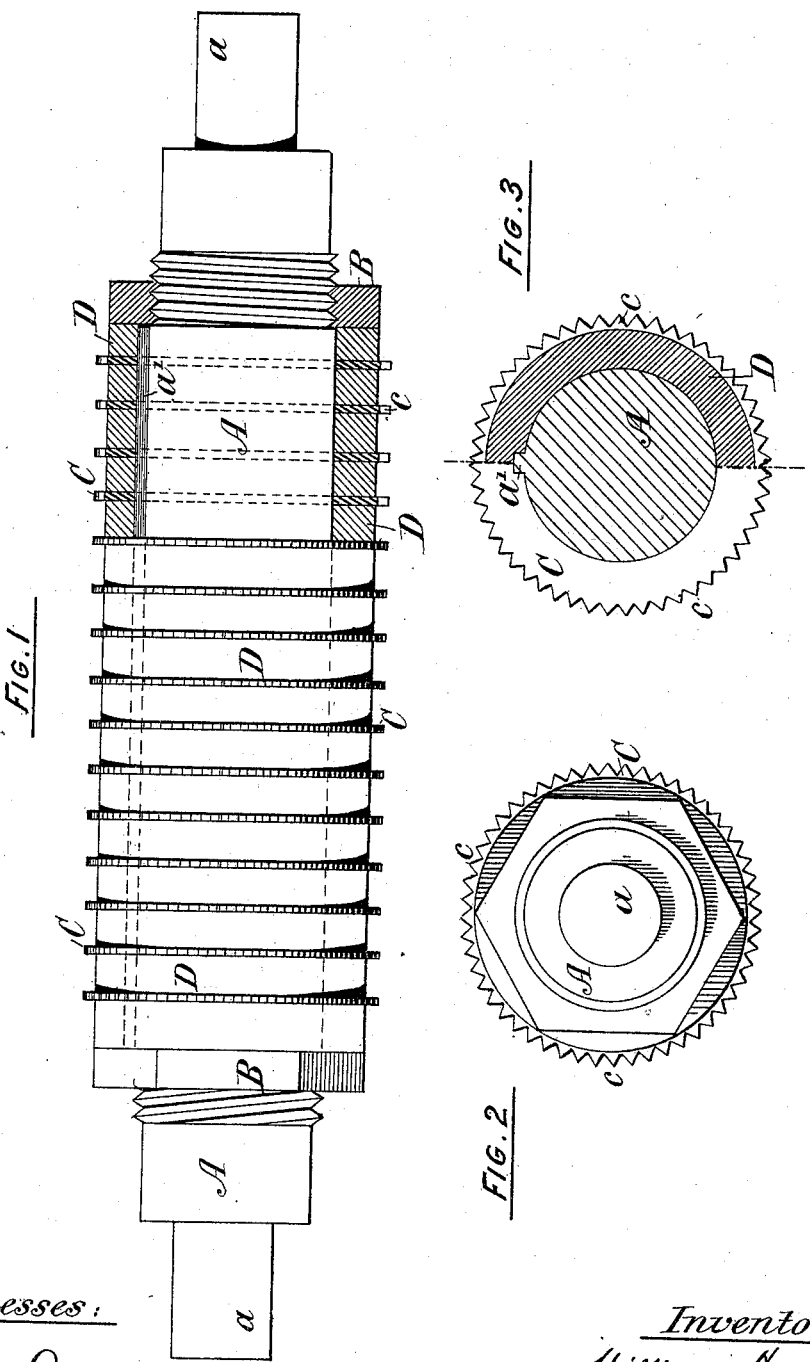
Witnesses:
C. McDowell
J. W. Treen
Inventor:
William Harvey
Per Attys.
Reynolds & Kellond

United States Patent Office.

WILLIAM HARVEY, OF ARNPRIOR, ONTARIO, CANADA, ASSIGNOR OF ONE-HALF TO HUGH FREDERICK McLACHLIN, OF SAME PLACE.

FEED-ROLL FOR GANG-SAWS.

SPECIFICATION forming part of Letters Patent No. 358,550, dated March 1, 1887.

Application filed January 18, 1886. Serial No. 188,820. (No model.)

*To all whom it may concern:*

Be it known that I, WILLIAM HARVEY, of Arnprior, in the county of Renfrew and Province of Ontario, in the Dominion of Canada, have invented certain new and useful Improvements in Feed-Rolls for Gang-Saws; and I do hereby declare that the following is a full, clear, and exact description of the same.

My invention relates to improvements in that class of rolls which are used in saw-mills to feed logs to gang-saws, and has for its object to afford a steadier feed than heretofore by preventing the logs from backing at the stroke of the saws, and also to obviate "stringing" and "chunking" of the lumber.

My invention consists, briefly speaking, in providing the roller with encircling toothed rings, each in line with a saw and spaced according to the width of lumber and number of boards to be sawed, and annular gage-collars slipped over the roll proper, and between each toothed ring, and the whole being held firmly in place by end nuts screwed to the roll.

For full comprehension of my invention reference must be had to the accompanying drawings, forming part of this specification, in which similar letters of reference indicate like parts, and where—

Figure 1 is a sectional elevation of my improved feed-roll, Fig. 2 an end view, and Fig. 3 a cross-section of the same.

A is the roll proper, and *a a* its journals. Near each end this roll is similarly threaded to receive right and left hand nuts B B, and the body has a feather, *a'*, formed on it for the remaining portion of its length.

Over the roll A are slipped a number of rings, C C, (preferably of steel,) having their peripheries divided into sharp teeth *c*, and between these toothed rings I place gage-collars D D, (usually of cast-iron,) both the toothed rings and collars being suitably checked to fit the feather *a'* on the roll, as shown particularly in Fig. 3.

There will be one toothed ring for each saw in the gang before which the roller is placed, and the collars D D are of the same width as the lumber to be sawed.

The teeth of the rings C C cut channels of their own depth in the log as it is fed toward the saws, and these channels are in the exact line of the saws. Therefore as the latter descend the channeling or scoring already made in the lower side of the log will prevent the saws from tearing out portions of the wood, as they do where no channels exist. The same teeth also grip the log firmly and prevent it from backing away from the saws, thus materially steadying the feed.

The nuts B B, threaded upon the roll, allow of the toothed rings and gage-collars being adjusted and interchanged to suit the saws in the gang, besides serving to hold the different parts firmly together.

If desired, one or more rings and gage collars may be formed in one, and various modifications of my invention may be made without departing from its essential features.

What I claim is—

1. A feed-roll for gang-saws having circular rows of teeth, such rows being so spaced as to be in line with the gang-saws, whereby channels are formed in the lumber in the lines of cutting and a smooth finish to each cut is insured, substantially as set forth.

2. A feed-roll for gang-saws carrying annular toothed rings spaced on the roll so as to be in line with the gang-saws and gage-collars, substantially as and for the purpose specified.

3. The combination, with the roll threaded and feathered substantially as described, of the toothed rings C C, spaced on the roll so as to be in line with the gang-saws, gage collars D D, and nuts B B, substantially as and for the purpose specified.

Signed at Arnprior, in the Province of Ontario, Canada, this 28th day of December, 1885.

WILLIAM HARVEY.

Witnesses:
RICHARD DULMAGE,
RICHARD MACNAMARA.